Jan. 15, 1924. 1,481,044
H. E. WARE
GATE
Original Filed Dec. 4, 1920  2 Sheets-Sheet 2
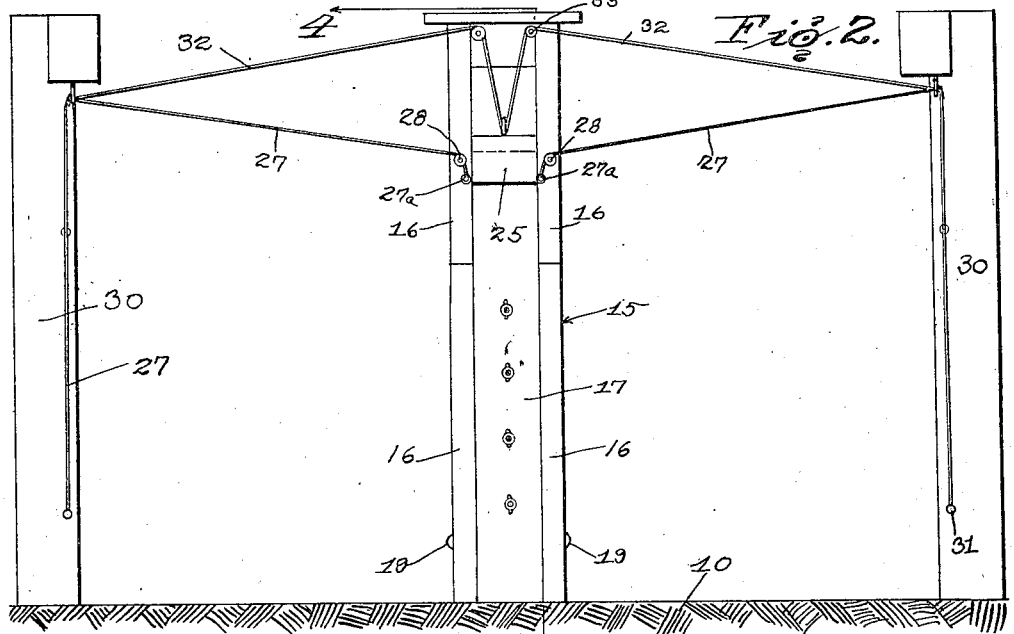
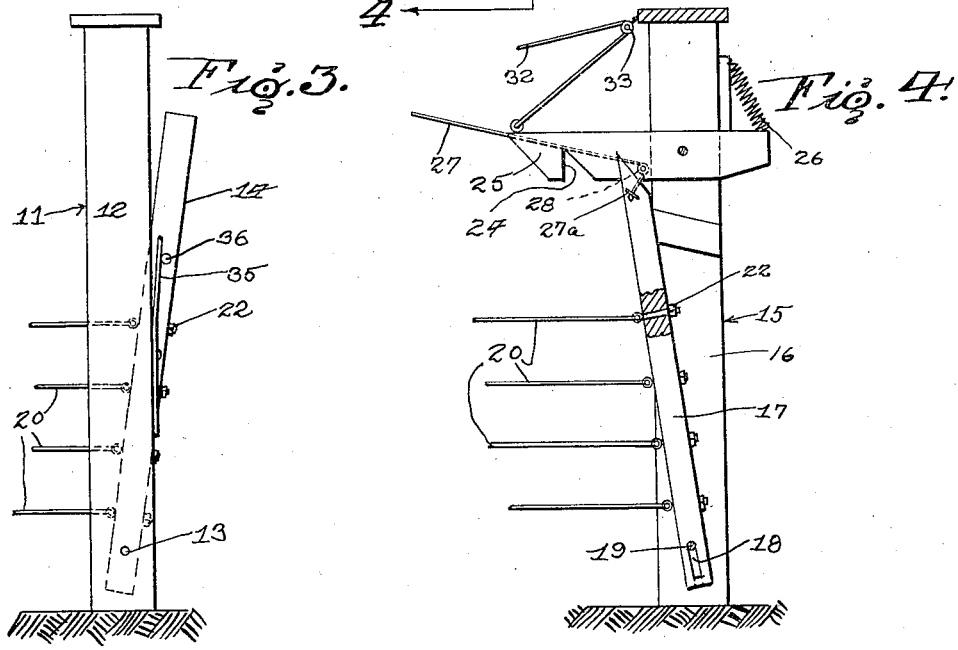
INVENTOR.
Henry E. Ware.
BY
Watson E. Coleman
ATTORNEY.

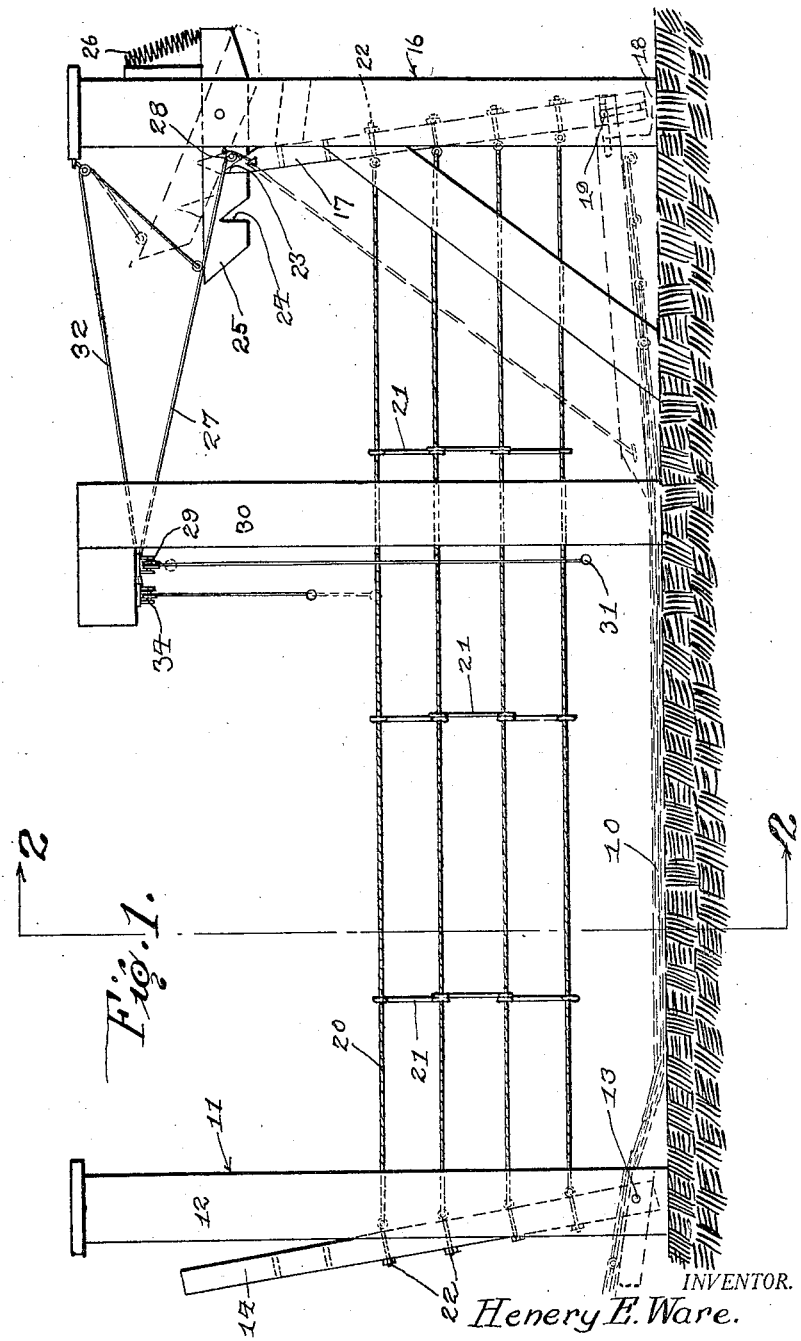

Patented Jan. 15, 1924.

1,481,044

UNITED STATES PATENT OFFICE.

HENRY E. WARE, OF MOORCROFT, WYOMING.

GATE.

Application filed December 4, 1920, Serial No. 428,338. Renewed June 21, 1923.

*To all whom it may concern:*

Be it known that I, HENRY E. WARE, a citizen of the United States, residing at Moorcroft, in the county of Crook and State of Wyoming, have invented certain new and useful Improvements in Gates, of which the following is a specification, reference being had to the accompanying drawings.

This invention relates to an improvement in gates and operating mechanism therefor.

An important object of the invention is to provide a novel construction of gate which is adapted to coact downwardly upon the right of way, permitting vehicles to pass thereover.

A further object of the invention is to provide means for easily and quickly shifting the gate to open and closed positions without necessitating the descension of the operator from his horse or vehicle.

A still further object is to provide an improvement in the mechanism which is so constructed, mounted and arranged that the gate will open and shut with ease and facility.

Other objects and advantages of the invention will become apparent throughout the course of the following description:—

In the accompanying drawings, wherein for the purpose of illustration is shown a preferred embodiment of my invention, and wherein like reference characters designate like parts throughout:—

Figure 1 is a side elevation of a gate constructed in accordance with my invention;

Figure 2 is a section on the line 2—2 of Figure 1;

Figure 3 is a side elevation of one of the end supports; and

Figure 4 is a sectional view partly in elevation of the other of the end supports.

Referring now more particularly to the drawings, the numeral 10 indicates the right of way, such as a road, horse track or the like. At one side of the right of way a support 11 is provided comprising a pair of spaced members 12 having pivotally connected thereto at the lower end thereof, as at 13, an end post 14 of the gate. At the opposite side of the right of way, but spaced therefrom a distance approximately equal to the length of the other end post of the gate is a second support 15 which likewise comprises a pair of spaced members 16.

The end post at this end of the gate, as indicated at 17, has its lower end vertically slotted, as indicated at 18, the slot extending transversely entirely through the post and being adapted for the reception of a pivot pin 19 having its ends mounted in the spaced members 16 forming the support.

The end post 17 is connected with the end post 14 by means of a plurality of normally horizontal strands 20 extending transversely of the right of way and preferably composed of a plurality of twisted wires. These transversely extending members are connected by vertical stays 21 of flexible material such as rope or chain. The ends of the strands 20 are connected to the end posts 14 and 17 by adjustable I-bolts 22 in order that the horizontal strands may be tightened when desired.

The upper end of the end post 17 of the gate is relatively sharpened, as indicated at 23, to afford a dog for coaction with the notches 24 of a ratchet 25 which is pivotally mounted intermediate its ends between the side members 16 of the support 17. The outer end of the ratchet or that end remote from the right of way, is connected by a tension spring 26 to the post or support 15 at a point above the pivot of the ratchet so that the inner end of the ratchet normally is moved downwardly for engagement with the pointed upper end of the end post 17.

Means for moving the post 17 upwardly to the vertical position is provided consisting in flexible elements 27 secured to the post 17 at each side thereof, as indicated at 27ª, each of the flexible elements passing about the pulley 28 carried by the side member 16 of the support 15 and extending to the pulley 29 carried by supports 30 spaced longitudinally of the right of way from the opposite sides of the gate. The free ends of the flexible elements 27 are preferably weighted as indicated at 31 in order that they may hang vertically and keep the flexible elements taut. Flexible elements 32 are likewise provided, each having one end secured to the inner end of the ratchet 25 and each passing over a pulley 33 carried by the support 15 and a pulley 34 carried by its respective support 30 and having its end weighted for the purpose previously described.

In order that the horizontal strands 20 may be suitably tensioned when the gate is in the elevated position and that the gate may have an impetus in its initial movement when released to move downwardly, I mount upon one of the side members 12 of the support 11 a spring 35 which is engaged by a lug 36 carried by the end post 14 of the gate as the gate arises adjacent its raised position to be compressed thereby.

In the operation of my gate, when it is desired to open the same, the operator grasps the end of one of the flexible elements 32 and by a downward pull thereon releases the ratchet 25 from the upper end of the post 17. The spring 35 gives a sharp initial movement to the gate causing the end posts of the gate to swing about their pivots toward the ground. At the same time the tension of the strands 20 tends to cause the post 17 to shift upon its pivot to the limit of the play allowed by the slot 18, releasing the tension upon the members 20 and causing the members 20 to lie in a compact mass upon the ground. The operator now drives his horse or vehicle across the members 20 and at the oposite side of the gate engages the flexible element connected to the gate bring the same to the vertical position.

It will be seen from the foregoing that I have constructed a gate which, by reason of its simplicity of construction and the ease of its operation, is particularly well adapted for the use for which it is intended. And it will likewise be obvious that the construction of the same as hereinbefore set forth is capable of some change without departing from the spirit of my invention. I, accordingly, do not limit myself to the specific construction as hereinbefore set forth, except as so limited by the sub-joined claims.

What I claim is:—

1. In a device of the type described, a pair of supports adapted to be arranged upon opposite sides of a right of way, end posts pivotally connected at their lower ends to said supports, horizontal members connected at their ends to said end posts and adapted to extend transversely of the right of way and bar passage thereon when said end posts are vertically arranged, means for locking said end posts in vertical position, means for releasing said locking means and means for imparting an initial swinging movement to said end posts when said locking means is released, said horizontal members forming a compact mass upon the surface of the right of way when said end posts are approximately horizontally disposed.

2. In a device of the type described, a pair of supports adapted to be arranged upon the opposite sides of the right of way, end posts pivotally connected at their lower ends to said supports, horizontal members connected at their ends to said end posts and adapted to extend transversely of the right of way and bar passage thereon when said end posts are vertically arranged, means for locking said end posts in vertical position, means for releasing said locking means and common means for imparting an initial swinging movement to said end posts when said locking means is released and for tensioning said horizontal members when the end posts are vertically disposed.

3. In a device of the type described, a pair of supports adapted to be arranged upon the opposite sides of the right of way, end posts pivotally connected at their lower ends to said supports, horizontal members connected at their ends to said end posts and adapted to extend transversely of the right of way and bar passage thereon when said end posts are vertically arranged, means for locking said end posts in vertical position, means for releasing said locking means and common means for imparting an initial swinging movement to said end posts when said locking means is released and for tensioning said horizontal members when the end posts are vertically disposed, comprising a spring carried by one of said supports and a lug carried by the end post pivoted to said support and adapted to engage said spring and compress the same as the end posts approach the vertical position.

4. In a device of the type described, a pair of supports adapted to be arranged upon the opposite sides of a right of way, end posts pivotally connected at their lower ends to said supports horizontal members connected at their ends to said end posts and adapted to extend transversely of the right of way and bar passage thereon when the end posts are vertically arranged, said horizontal members being taut when said end posts are vertically disposed, releasable locking means for retaining said end posts in vertical position and means for lessening the distance between said end posts as they approach a horizontal position whereby said horizontal members are slackened and form a compact mass upon the surface of the right of way.

5. In a device of the type described, a pair of supports adapted to be arranged upon the opposite sides of a right of way, end posts pivotally connected at their lower ends to said supports, horizontal members connected at their ends to said end posts and adapted to extend transversely of the right of way and bar passage thereon when the end posts are vertically arranged, said horizontal members being taut when said posts are vertically disposed, releasable locking means for retaining said end posts in vertical position and means permitting bodily shifting of one of said end posts toward the other of said end posts as they approach a horizontal position whereby said horizontal members are slackened and form a compact mass upon the surface of the right of way when the end posts are horizontally disposed.

In testimony whereof I hereunto affix my signature.

HENRY E. WARE.